(12) United States Patent
Huarong (10) Patent No.: US 12,044,384 B2
(45) Date of Patent: Jul. 23, 2024

(54) ARTICULATED DEVICE AND FOLDABLE STAR LAMP COMPRISING THE SAME

(71) Applicant: Xie Huarong, Dongguan (CN)

(72) Inventor: Xie Huarong, Dongguan (CN)

(*) Notice: Subject to any disclaimer, the term of this patent is extended or adjusted under 35 U.S.C. 154(b) by 0 days.

(21) Appl. No.: 18/107,056

(22) Filed: Feb. 8, 2023

(65) Prior Publication Data

US 2023/0250940 A1 Aug. 10, 2023

(30) Foreign Application Priority Data

Feb. 8, 2022 (CN) .......................... 202220259635.3

(51) Int. Cl.
| | | |
|---|---|---|
| *F21V 17/06* | (2006.01) | |
| *F21V 17/00* | (2006.01) | |
| *F21V 17/14* | (2006.01) | |
| *F21V 21/26* | (2006.01) | |
| *F21W 121/00* | (2006.01) | |

(52) U.S. Cl.
CPC ............ *F21V 17/06* (2013.01); *F21V 17/002* (2013.01); *F21V 17/14* (2013.01); *F21V 21/26* (2013.01); *F16C 2362/00* (2013.01); *F21V 17/007* (2013.01); *F21W 2121/00* (2013.01)

(58) Field of Classification Search
CPC ...... F21V 17/06; F21V 17/002; F21V 17/007; F21V 17/14; F21V 21/26; F16C 2362/00; F16C 11/04
See application file for complete search history.

(56) References Cited

U.S. PATENT DOCUMENTS

| | | | |
|---|---|---|---|
| 8,072,123 B1* | 12/2011 | Han | F21K 9/65 |
| | | | 313/45 |
| 10,274,172 B1* | 4/2019 | Chiu | F21V 17/02 |
| 2003/0156411 A1* | 8/2003 | Ahroni | F21S 2/00 |
| | | | 362/249.01 |
| 2005/0231975 A1* | 10/2005 | Bixler | A47G 33/08 |
| | | | 362/565 |
| 2013/0051079 A1* | 2/2013 | Xu | F21S 4/10 |
| | | | 362/640 |
| 2014/0105670 A1* | 4/2014 | Plomteux | F16C 11/103 |
| | | | 403/83 |

* cited by examiner

*Primary Examiner* — Tracie Y Green
*Assistant Examiner* — Michael Chiang
(74) *Attorney, Agent, or Firm* — Jose Cherson Weissbrot (57) ABSTRACT

The present disclosure relates to the technical field of decorative lamps, and provides an articulated device and a foldable star lamp including the same. The articulated device includes an articulated joint and an articulated base, wherein the articulated joint includes an articulated joint bottom and an articulated joint top, the articulated joint bottom is sleeved on the articulated base and is capable of pivoting around a fixed axle, the articulated base is provided with a first stop block for preventing excessive rotation of the articulated joint.

8 Claims, 6 Drawing Sheets

ARTICULATED DEVICE AND FOLDABLE STAR LAMP COMPRISING THE SAME

CROSS-REFERENCE TO RELATED APPLICATION

The present application is based upon and claims priority to Chinese patent application No. 202220259635.3, filed on Feb. 8, 2022, the entire content of which is incorporated herein by reference.

TECHNICAL FIELD

The present application relates to the technical field of decorative lamps, in particular to an articulated device and a foldable star lamp comprising the same.

BACKGROUND

With the continuous development of society and the advancement of science and technology, there are more and more decorative lamps on the market. Some of the existing explosion star decorative lamps are made by directly connecting multiple copper wire LED lights, which are not beautiful enough and have unsatisfactory decorative effects; some type has star-shaped structure, but the interior is laser light, the light source has no variability, it is inconvenient to adjust, and the structure is not strong enough, so it is easy to be damaged during transportation and use. And there is another disadvantage that the direction of the light bar is fixed and the angle cannot be adjusted, which limits the applicability of the product, so further improvement is needed on the existing product.

SUMMARY

The purpose of the embodiments of the present disclosure is to provide an articulated device and a foldable star lamp simulating the explosion comprising the articulated device.

The first embodiment of the present application provides an articulated device comprising an articulated joint and an articulated base, wherein the articulated joint comprises an articulated joint bottom and an articulated joint top, and the articulated joint top has an outer diameter less than that of the articulated joint bottom, the articulated joint bottom is sleeved on the articulated base and is capable of pivoting around a fixed axle, the articulated base is provided with a first stop block for preventing excessive rotation of the articulated joint, the articulated joint and the articulated base both have a hollow structure.

Furthermore, the articulated joint bottom is provided with a connection hole and a connection groove for connecting with the articulated base, and the articulated base has an outer wall provided with a connection pin connected with the connection hole and a connection groove.

Furthermore, the connection hole does not pass through a bottom surface of the articulated joint bottom, while the connection groove is connected with the bottom surface of the articulated joint bottom.

Furthermore, there are a plurality of second stop blocks symmetrically provided on the upper out wall of the articulated joint for engaging and fixedly connecting with a hollow tube.

Furthermore, the articulated joint bottom is substantially helmet-shaped, wherein the articulated joint bottom has a top surface of truncated cone shape, and has an open space between a front side and a bottom surface.

Furthermore, the articulated base comprises two parallel walls, each of the two parallel walls has one or more protrusions, the first stop block is arranged on each of the two parallel walls, and the connection pin is arranged outside of each of the two parallel walls.

Another embodiment of the present application provides a foldable star lamp comprising a plurality of the above said articulated devices, wherein the star lamp further comprises a connector and a lamp body, the articulated devices which are equidistantly arranged on a surface of the connector, the lamp body comprises a hollow tube for arranging a light source inside.

Furthermore, the connector has at least one circular section, a connection sleeve is arranged at a center of an outer surface of the connector, and the articulated base is equally spaced outside the circular section, the hollow tube has a sum number equal to that of the connection sleeves plus the articulated devices.

Furthermore, the connector is formed by buckling a first disc and a second disc together, and an extension tube is arranged on the connector.

Furthermore, the hollow tube has a bottom symmetrically provided with a plurality of clamp slots each matching with the stop block, and the clamp slots each has a shape of L consisting of a longitudinal groove along a length direction of the hollow tube and a transverse groove perpendicular thereto, and the hollow tube has a third stop block provided at an open end thereof.

The star lamp of the present disclosure has the following beneficial effects: by changing the connection structure of the traditional explosion star lamp into a hinged device, the angle of the lamp tube on the explosion star lamp can be adjusted and folded, reducing the volume of the explosion star lamp and increasing the applicability.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DETAILED DESCRIPTION OF THE EMBODIMENTS

The technical solutions in the embodiments of the present application will be clearly and completely described in combination with the drawings in the embodiments of the present application. Obviously, the described embodiments are some embodiments of the present application, but not all embodiments. Based on the embodiments of the present application, all other embodiments obtained by a person skilled in the art with the premise of no creative effort belong to the protection scope of the present application.

The present application provides a foldable star lamp simulating explosion, as shown in FIG. 1-5. In particular, the star lamp comprises a connector 11, a hinge device 12 pivotally connected with the connector 11 and a lamp body. The lamp body includes a hollow tube 13 and a light, such as an LED light (not shown in the figure) disposed in the hollow tube 13. The connector 11 has at least one circular section, and a plurality of hinge devices 12 are equidistantly arranged on the periphery of the circular section (preferably two rows arranged symmetrically), the connection sleeve 114 is arranged outwardly at the center of the connector 11 (coinciding with the axis direction), and the hinge devices 12 are equidistantly arranged on the concentric circle taking the center of the connecting sleeve 114 as the circle center. Each hollow tube 13 is connected to the hinge device 12 and the connecting sleeve 114, and the number of hollow tubes 13 is equal to the sum of the hinge device 12 and the connecting sleeve 114 (there are 2 connecting sleeves 114 and 12 hinge devices 12 in the embodiment shown in the Figures).

Figure 9:
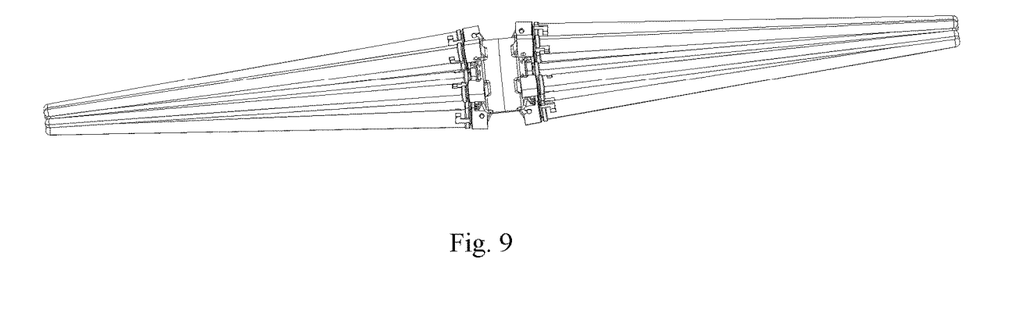
FIG. 9 is a second reference diagram in use of the foldable explosive star lamp provided by the present application.

In the prior art, the hollow tubes of the explosive star lamp cannot rotate, and the product purchased by the user must be installed before use. The hollow tube may be damaged during installation. In addition, the hollow tube (light casing) cannot rotate relative to the connector, and the appearance cannot be adjusted. In the product of the present application, the hollow tube 13 connected to the hinged device 12 can be rotated within a certain range. When the tubes 13 are rotated to bond together, the star lamp can be folded (as shown in FIG. 9). At this time, the volume of the star lamp is the smallest, which is convenient for packaging and transportation.

Figure 1:
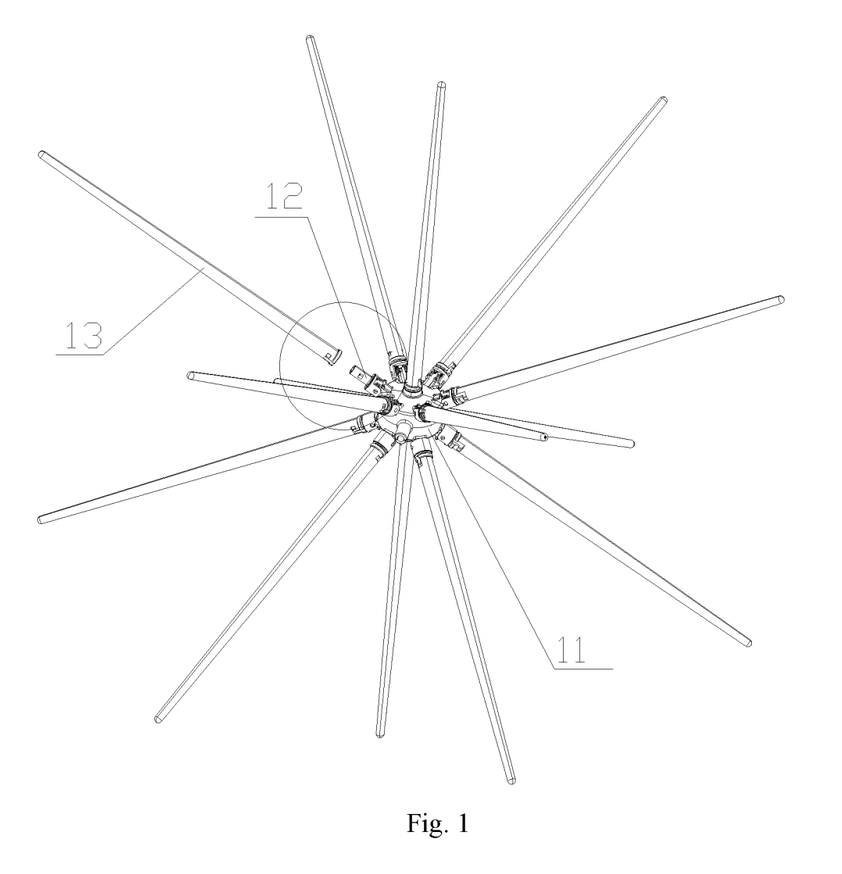
FIG. 1 is a schematic structural diagram of a foldable exploding star lamp provided by an embodiment of the present application.
Figure 2:
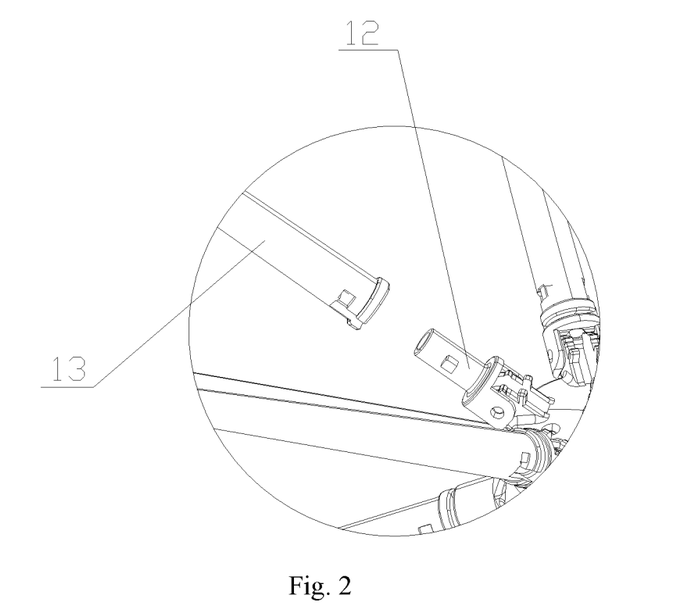
FIG. 2 is a partially enlarged view of a part of FIG. 1.
Figure 3:
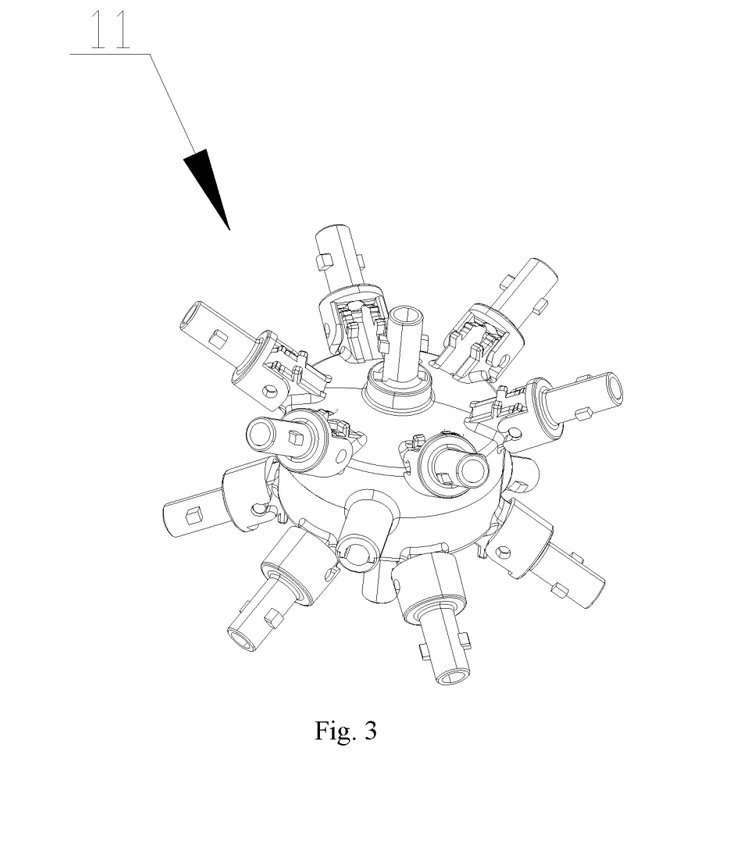
FIG. 3 is a schematic diagram of the connector of the foldable exploding star lamp provided by the present application.
Figure 4:
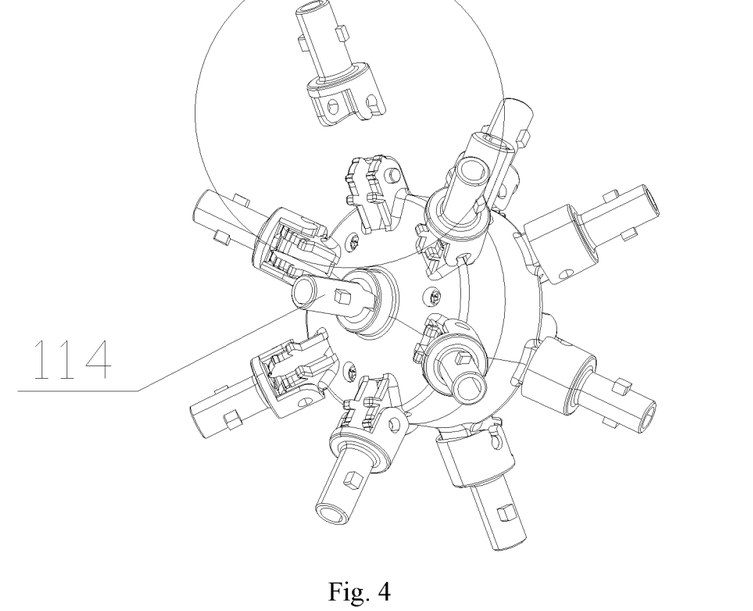
FIG. 4 is a structural schematic diagram of the articulated device of the foldable exploding star lamp provided by the present application.
Figure 5:
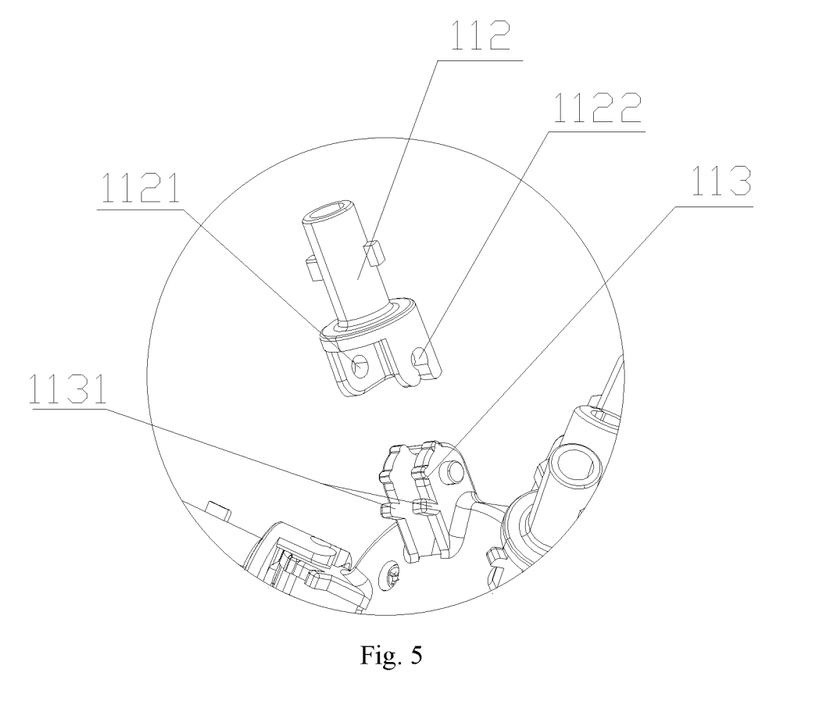
FIG. 5 is a partial enlarged view of FIG. 4.

Further, the foldable star lamp may include one or more rows of hinge devices 12 arranged outside the connector 11, in the present embodiment, there are two rows of hinge devices 12, as shown in FIG. 4. In particular, with reference to FIG. 5, the hinge device 12 includes a hinge head 112 and a hinge base 113, the hinge head 112 is divided into the bottom of the hinge head and the upper part of the hinge head, and the upper part of the hinge head is roughly a hollow cylinder (the hollow part is configured for inserting copper wires lamp or other linear light source, such as LED light), the outer diameter is smaller than the bottom of the hinged joint, and is configured for coupling with the hollow tube 13, and the outer wall of the upper part of the hinged joint is symmetrically provided with a plurality of stop blocks (preferably 2 stop blocks) for snapping and fixedly connecting with the hollow tubes 13. The shape of the bottom of the hinge joint is roughly helmet-shaped, and the top surface forms a circular truncated cone, the interior communicates with the upper part of the hinge joint for passing through the copper wire light, and the front side and the bottom surface are not closed. There is an open space between the front side and the bottom surface so the hinge joint can be installed into the hinge base 113 and rotate at a certain angle. In a preferred embodiment, the left and right sides of the bottom of the hinge joint are provided with an connection hole and a through groove, in particular, the connection hole 1121 is arranged on one side and which does not pass through the bottom surface, and the through slot 1122 (connection groove) is arranged on the other side which is connected with the bottom surface, in this setting mode, it can facilitate the installation and disassembly of the hinge head 112. Specifically, the bottom of the joint and the top of the joint are integrally formed. The inner side of the bottom of the hinge has a rectangular section for matching with the hinge base 113, and the upper edge of the bottom of the hinge is circular for abutting against the stop block 1131 on the hinge base.

Further, the hinge base 113 is arranged on the outer surface of the connector 11 and extends outward from the surface of the connector 11, specifically, both two sides of the hinge base 113 (only one side is shown in the figure) are provided with a connection pin for connecting with the hinge head 112 (for inserting into the connecting hole 1121 and the connecting groove 1122), it is set in a cylindrical shape so that the hinge head 112 can rotate around the hinge base 113. The hinge base 113 is surrounded by three walls to form a hollow structure, two of which are parallel to each other, and the outer side is provided with a connecting pin, and the other wall is perpendicular to these two walls and there is a space enclosed by these three walls. The top of each of the two parallel walls has a substantially smooth curve, and a plurality of protrusions are arranged thereon, and a stop block 1131 is arranged on a side surface close to the connecting sleeve 114 for preventing the hinge head 112 from over-rotating. In the preferred embodiment shown in FIG. 5, two protrusions respectively provided on the left and right sides of the top of the hinged base 113, so that when the hollow tube 13 is rotated, there will be two angles for adjusting, so that the decorative effect is better. When in use, align the connecting hole 1121 and the connecting groove 1122 at the bottom of the hinge head with the connecting pin on both sides of the hinged base 113 and install them to complete the hinged connection.

Further, in another embodiment, the connection manner between the hinge base 113 and the hinge head 112 may be a ball hinge connection.

Further, the hollow tube 13 connected to the hinged head 112 can rotate within the fan-shaped plane formed by the extension line of the connecting sleeve 114 and the direction pointed by the hinged base 113.

Figure 6:
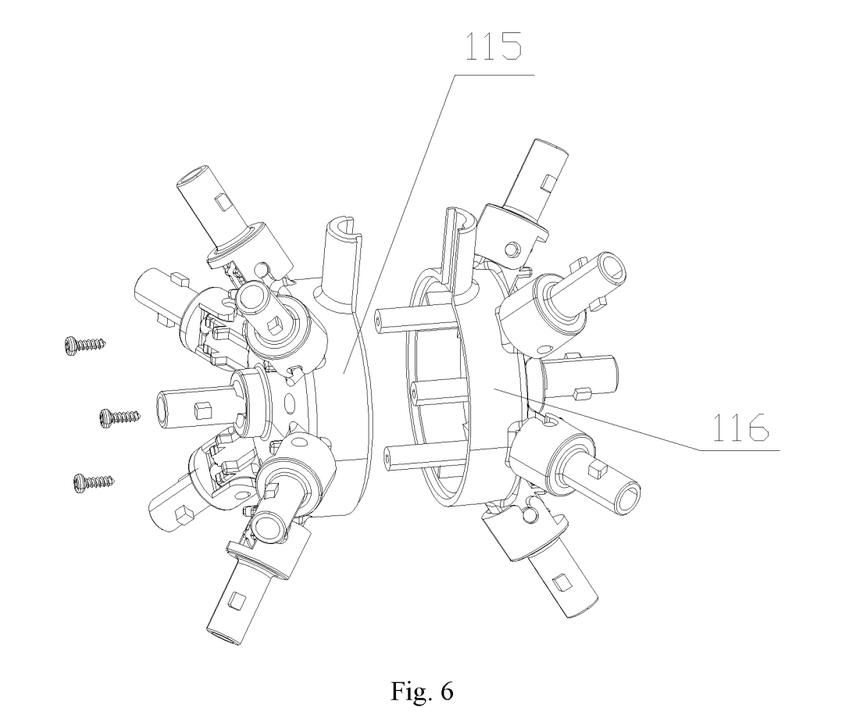
FIG. 6 is an exploded schematic diagram of the connector of the foldable explosive star lamp provided by the present application.

Further, as shown in FIG. 6, the connector 11 includes a first disc 115 and a second disc 116, and the two discs can be buckled together. In one embodiment, after the two discs 116 are engaged, the first disc 115 and the second disc 116 can be fixed by screws to prevent falling off. The inside of the connector 11 is hollow, and a circuit board (not shown in the figure) can be arranged to control the on and off status and various changes of the copper wire lamp (not shown in the Figure) or other lighting sources, so as to realize variable lighting. The center of the first disc 115 and the second disc 116 each is provided with a connecting sleeve 114 (as shown in FIG. 4) outwards, and a plurality of hinged bases 113 are provided on the edge, preferably, these hinged bases 113 are symmetrically arranged. The hinge base 113 is the base of the hinge head 112, and the hinge head 112 is engaged with the hollow tube 13. After all the hollow tube 13 are installed, these product shows the shape of an exploding star, which is very beautiful.

Further, the surfaces of the first disc 115 and the second disc 116 can also be respectively provided with extension tube parts, and when the first disc 115 and the second disc 116 are fastened together, a complete joint is formed on the fastening line. The extension tube that extends outwards can be used with a fixed base or a ground rod. The head of the ground rod has a tip part, and the shape is preferably arrow-shaped, which can fix the explosive star lamp on the ground and increase the application scope of the explosive star lamp. In one embodiment, the extension tube is sleeved inside the ground rod.

Figure 7:
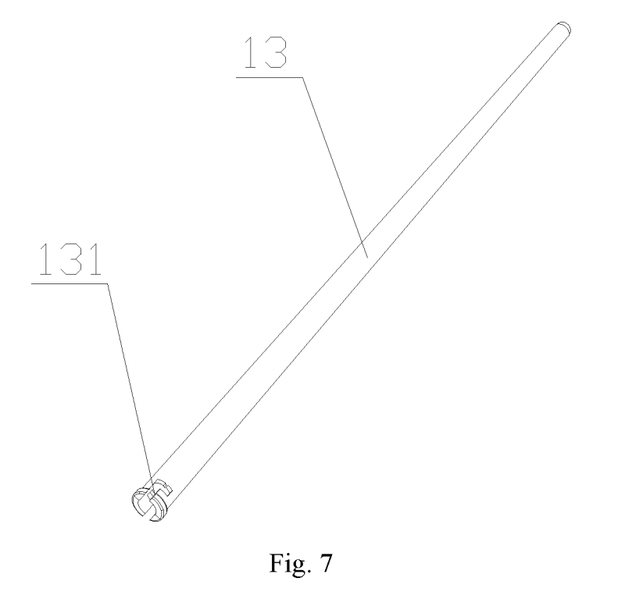
FIG. 7 is a structural schematic diagram of hollow tube of the foldable explosive star lamp provided by the present application.
Figure 10:
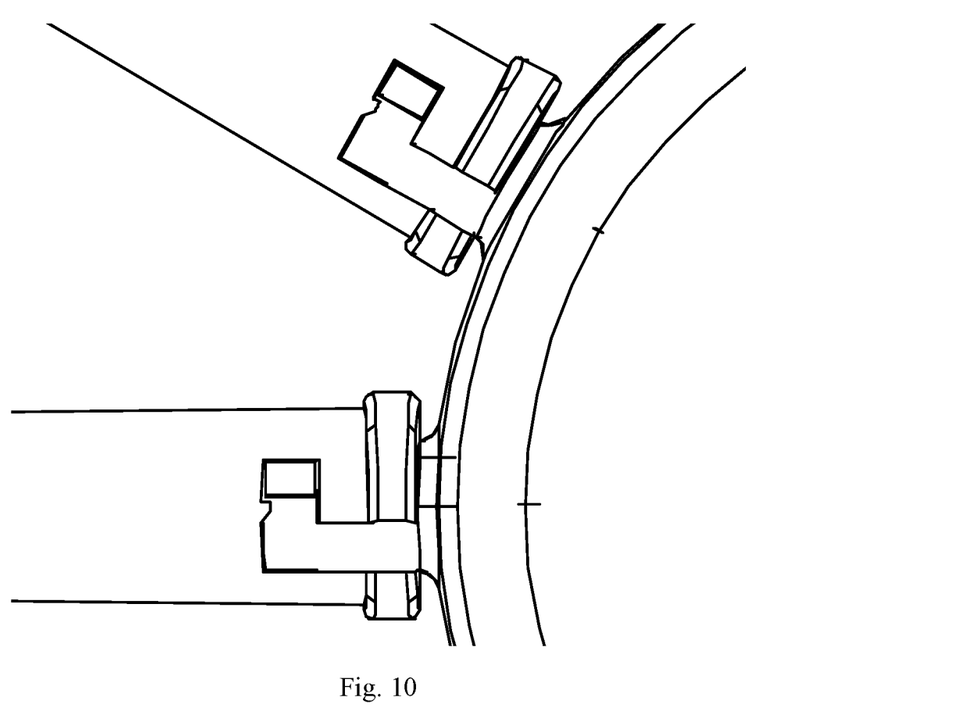
FIG. 10 is a structural schematic diagram showing the trapezoid stop block at the open end of hollow tube.

Further, as shown in FIG. 7, the hollow tube 13 has a hollow and elongated tubular structure, one end is symmetrically provided with a plurality of clamp slots 131 each matching with the stop block, and the other end is blocked. In particular, the clamp slots each has a shape of substantial L consisting of a longitudinal groove along a length direction of the hollow tube 13 and a transverse groove perpendicular thereto, and the hollow tube 13 has a trapezoidal stop block provided at an open end thereof. When in use, the hollow tube 13 is sleeved on the outside of the hinge device 12, the stop block is inserted into the longitudinal groove of the clamp slot 131, and then the hollow tube 13 is rotated so that the stop block outside the hollow tube 13 enters the transverse groove of L-shaped slot. The clamping and fixing are realized in the transverse grooves. Compared with the plug-in structure or socket structure in the prior art, this structure has a stronger connection and is more beautiful. Preferably, please refer to FIG. 10, an end of the hollow tube 13 has an opening provided with a trapezoid stop block, which is arranged on the transverse slot and configured for locking the stop block on the connection sleeve at an end of the transverse slot.

Further, the hollow tube 13 is preferably with a translucent or transparent structure, and a copper wire lamp or other light source (not shown in the Figures) is arranged inside, preferably a copper wire lamp, wherein the copper wire lamp can be a two-wire, three-wire or four-wire light structure, the length of the copper wire lamp is at least half of the length of the hollow tube 13. By arranging light sources such as copper wire lamps in the hollow tube 13, the integration of lighting and decoration functions is realized. The hollow tube 13 can be made of glass, plastic and other materials.

Further, the cross-section of the hollow tube 13 is circular, and in other embodiments, the cross-section of the hollow tube 13 may be in other shapes, such as square or rectangle.

Figure 8:
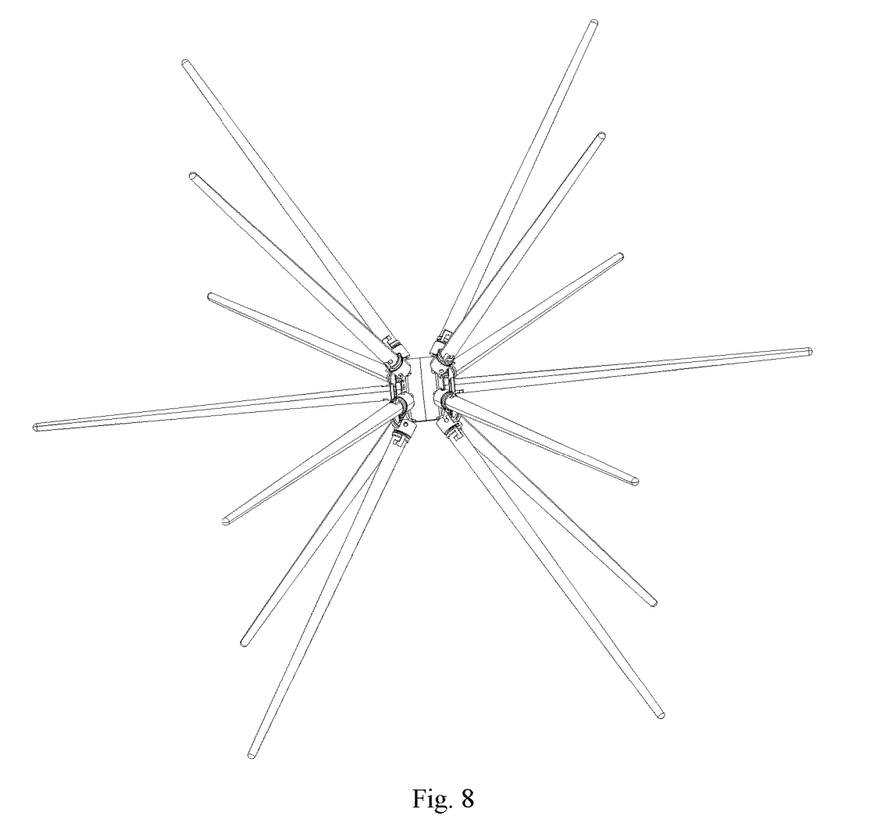
FIG. 8 is a first reference diagram in use of the foldable explosive star lamp provided by the present application.

The use process of the present product is: as shown in FIG. 8 and FIG. 9, when in use, first set the control chip of the copper wire lamp in the hollow interior of the connector 11, and then the copper wire lamp passes through the tube of the corresponding hinge device 12, fasten the connector 11, then install the hollow tube 13 on the hinge device 12 and the connecting sleeve 114 through the buckle structure, and adjust the hinge device 12 to make the hollow tube 13 arranged at the required angle, and finally the lamp shows the appearance of an star simulating explosion, and then connect the ground rod with the extension tube according to the needs, so that the star lamp can be fixed on the ground, or directly hang the explosion star lamp on the desired position, and finally turn on the power, that is, start using. When it needs to be folded, rotate the other hollow tubes 13 connected with the hinge device 12 towards the hollow tube 13 connected with the connecting sleeve 114 until the stop block catches the hollow tube 13, and the folding is completed.

The present disclosure has the following beneficial effects: by changing the connection structure of the traditional explosion star lamp into a hinged device, the angle of the lamp tube on the explosion star lamp can be adjusted and folded, reducing the volume of the explosion star lamp and increasing the applicability.

The present invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. An articulated device comprising an articulated joint and an articulated base, wherein the articulated joint comprises an articulated joint bottom and an articulated joint top, and the articulated joint top has an outer diameter less than that of the articulated joint bottom, the articulated joint bottom is sleeved on the articulated base and is capable of pivoting around a fixed axle, the articulated base is provided with a first stop block for preventing excessive rotation of the articulated joint, the articulated joint and the articulated base both have a hollow structure;

the articulated joint bottom is provided with a connection hole and a connection groove for connecting with the articulated base, and the articulated base has an outer wall provided with a connection pin connected with the connection hole and the connection groove;

the connection hole does not pass through a bottom surface of the articulated joint bottom, while the connection groove is connected with the bottom surface of the articulated joint bottom.

2. The articulated device of claim 1, wherein there are a plurality of second stop blocks symmetrically provided on an upper out wall of the articulated joint for engaging and fixedly connecting with a hollow tube.

3. The articulated device of claim 1, wherein the articulated joint bottom is substantially helmet-shaped, wherein the articulated joint bottom has a top surface of truncated cone shape, and has an open space between a front side and a bottom surface.

4. The articulated device of claim 1, wherein the articulated base comprises two parallel walls, each of the two parallel walls has one or more protrusions, the first stop block is arranged on each of the two parallel walls, and the connection pin is arranged outside of each of the two parallel walls.

5. A foldable star lamp comprising the articulated device of claim 1, wherein the star lamp further comprises a connector and a lamp body, there are a plurality of the articulated devices which are equidistantly arranged on a surface of the connector, the lamp body comprises a hollow tube for arranging a light source inside.

6. The foldable star lamp of claim 5, wherein the connector has at least one circular section, one or more connection sleeves are arranged at a center of an outer surface of the connector, and the articulated bases are equally spaced outside the circular section, the star lamp further comprises a plurality of the hollow tubes with a sum number equal to that of the connection sleeves plus the articulated devices.

7. The foldable star lamp of claim 5, wherein the connector is formed by buckling a first disc and a second disc together, and an extension tube is arranged on the connector.

8. The foldable star lamp of claim 5, wherein the hollow tube has a bottom symmetrically provided with a plurality of clamp slots each matching with the stop block, and the clamp slots each has a shape of L consisting of a longitudinal groove along a length direction of the hollow tube and a transverse groove perpendicular thereto, and the hollow tube has a third stop block provided at an open end thereof.

* * * * *